United States Patent
Ainsworth

[15] 3,668,413
[45] June 6, 1972

[54] CONTROL SYSTEM FOR HIGH VOLTAGE D.C. LINK CONNECTED BETWEEN A.C. SYSTEMS

[72] Inventor: John Desmond Ainsworth, c/o The English Electric Co. Limited, Strafford, England

[73] Assignee: The English Electric Company Limited, London, England

[22] Filed: May 11, 1970

[21] Appl. No.: 36,156

[30] Foreign Application Priority Data

May 9, 1969 Great Britain......................23,663/69

[52] U.S. Cl..........................................307/2, 307/26, 321/38
[51] Int. Cl. ..........................................................H02m
[58] Field of Search ..................................321/4, 11–13, 38, 321/40; 307/1, 2, 22, 25, 26, 45, 84, 87

[56] References Cited

UNITED STATES PATENTS

| | | | |
|---|---|---|---|
| 3,525,032 | 8/1970 | Torok | 321/38 X |
| 3,551,778 | 12/1970 | Ekstrom | 321/38 X |
| 2,419,464 | 4/1947 | Schmidt | 321/4 |
| 3,275,838 | 9/1966 | Almstrom | 321/4 |
| 3,487,286 | 12/1969 | Persson | 321/11 X |
| 3,436,647 | 4/1969 | Gobeli et al | 307/87 X |

Primary Examiner—William H. Beha, Jr.
Attorney—Misegades & Douglas

[57] ABSTRACT

The invention in this application relates to a control system for controlling the power or current in an H.V.D.C. link connected between two a.c. systems and is employed particularly to damp power oscillations developed in such systems which frequently occur after any large disturbances, such as a temporary line short circuit. In particular, the system includes apparatus for defining an output signal proportional to a change function of absolute phase angle $\phi$ of the alternating voltage in at least one of the a.c. systems, and a control circuit for controlling the converters in the d.c. link. The control circuit is responsive to a signal depending on both the output signal from the apparatus and a predetermined order signal whereby the d.c. link is controlled to have a component of variation proportional to the said change function.

5 Claims, 2 Drawing Figures

CONTROL SYSTEM FOR HIGH VOLTAGE D.C. LINK CONNECTED BETWEEN A.C. SYSTEMS

This invention relates to a control system for controlling the power or current in a high voltage d.c. link connected between two a.c. systems, and is employed particularly to damp power oscillations developed in such systems which frequently occur after any large disturbance, such as a temporary line short-circuit.

From one aspect, the present invention provides a control system for controlling electrical power or current in a high voltage d.c. link connected between two a.c. systems, including apparatus for deriving an output signal proportional to a change-function of absolute phase angle $\phi$ of an alternating voltage in at least one of the a.c. systems, which change-function is substantially of the form $$f(p) = K\phi \cdot pT_1/(1+pT_1) \cdot pT_2/(1+pT_2) - pT_n/(1+pT_n)$$

where $K$ is a gain constant, $T_1 - T_n$ are time constants and $p$ is the differential operator $d/dt$; control signal generating means operative in response to a predetermined power or current order signal and to said output signal to generate a control signal; and a control circuit for controlling converting apparatus in the d.c. link to impart to said power or current, in response to said control signal, a component of variation proportional to said change-function.

In addition to damping power oscillations, the control system according to this invention may readily effect steady-state load sharing between the various a.c. generators employed and the d.c. link.

In order that the invention may be fully understood, one embodiment thereof will now be described with reference to the accompanying drawings, in which.

Figure 1:
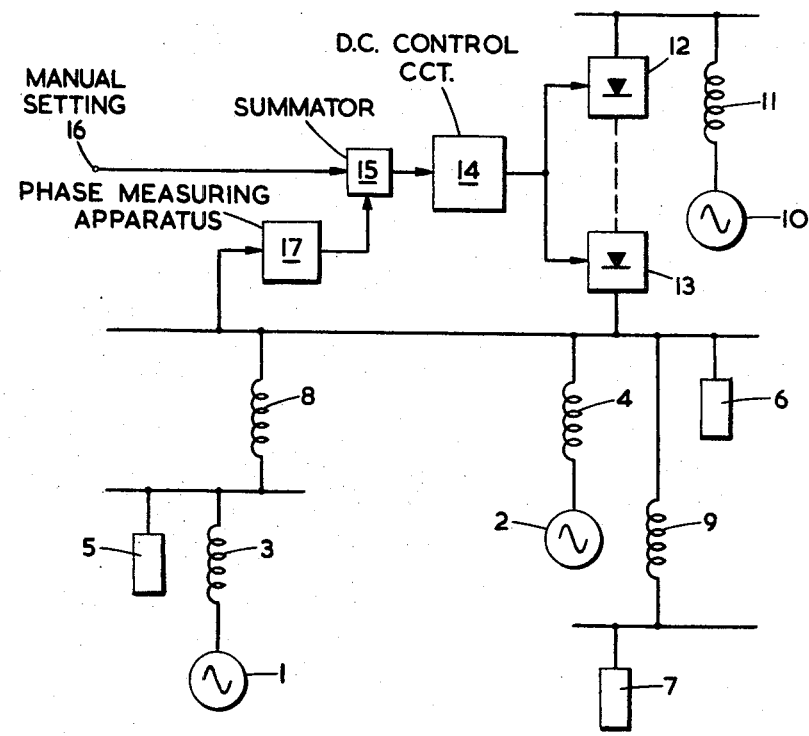
FIG. 1 illustrates one form of control system according to this invention.

Referring now to FIG. 1, a simple power system is shown comprising two a.c. systems interconnected by a d.c. link. One a.c. system comprises synchronous generators 1 and 2, together with their reactances 3, 4, supplying loads 5, 6 and 7, with the line reactances being schematically illustrated at 8, 9, whilst the other system comprises a single generator 10 together with its associated reactance 11. The d.c. link embodies two convertors 12, 13 operating as a rectifier and invertor, respectively.

The control of the convertors is effected through a control circuit 14 responsive to the output from a summator 15 which adds together a manually set power or current order signal on terminal 16, and the output from measuring apparatus 17 which derives an auxiliary signal proportional to a change-function of absolute busbar phase angle $\phi$ of the a.c. system to which it is connected.

In operation, any disturbance in the system shown, such as switching a large load or a temporary short-circuit at any point, initiates oscillations in the power flows in the machines and lines, typically of the order of 0.3 to 3Hz. The measuring apparatus 17, as mentioned above, derives an auxiliary signal proportional to a change-function of the absolute phase angle of the a.c. system, which is affected by the oscillations, and the resultant signal applied to the control circuit 14 effective to damp these oscillations is, with a power order signal on terminal 16, of the form $P$ order $= P$ setting $+ f(p) \phi$ $f(p)$ is determined by the measuring apparatus 17 and is of the form $$f(p) = K pT_1/(1+pT_1) \cdot pT_2/(1+pT_2) - pT_n/(1+pT_n)$$

where $K$ is a gain constant (watts per radian) and $T_1, T_2-T_n$ are time constants.

In practice, the apparatus is designed such that the function has only one, two or three terms.

With a constant value of phase angle $\phi$, the auxiliary signal is zero, but for small frequency changes $\Delta f$ from a nominal value it can be shown that $$p\phi = 2\pi\Delta f$$

Thus, with the measuring apparatus designed for a single term $KpT_1/(1+pT_1)$, then, for a constant frequency error, the auxiliary control signal settles down to a constant value $K.2\pi\Delta f.T_1$.

This method therefore provides power/frequency control, the d.c. power being dependent on frequency error with a power/frequency slope of $2\pi KT_1$ watts per Hz. This type of steady-state control characteristic is, incidentally, similar to that of a.c. generators, so that the system shown could readily be used for determining steady-state load sharing between the a.c. generators and the d.c. link.

With the measuring apparatus designed for a double term change-function, i.e.

$$f(p) = K pT_1/(1+pT_1) \cdot pT_2/(1+pT_2)$$

an improved damping effect may be obtained over the use of the single term change-function.

Further, the use of a summation of combinations of different functions is possible. For example, one such function is:

$$f(p) = K_1 pT_1/(1+pT_1) \cdot pT_2/(1+pT_2) + K_2 pT_3/(1+pT_3)$$

In this function, the constants $K_1, T_1, T_2$ in the double term change-function may be chosen solely to provide damping to the a.c. system whilst the constants $K_2, T_3$ may be chosen solely to provide a suitable power/frequency characteristic for load sharing. Thus, the two functions of damping and load sharing can be made to be substantially independently adjustable by providing suitable pre-set controls for the constants.

With a two-terminal d.c. link, as shown, it is possible to derive signals from each of the two a.c. systems so that the d.c. power is responsive to their sum, the signals derived embodying one, or two or more change-function terms in dependence on the complexity of the a.c. system.

Since changes in the d.c. power necessarily affect both of the a.c. systems, a disturbance in one system will result in a disturbance in the other, but in practice good damping has been found possible even in cases where these mutual effects are at their worst, i.e. when both a.c. systems have similar oscillation frequencies.

With control from the two a.c. systems, a telecommunication link for one of the signals will be required where the d.c. control circuit is situated at one of the convertor stations.

In some cases the a.c. systems may be additionally connected via one, or two or more a.c. lines, i.e. a.c. lines parallel to the d.c. link.

Figure 2:
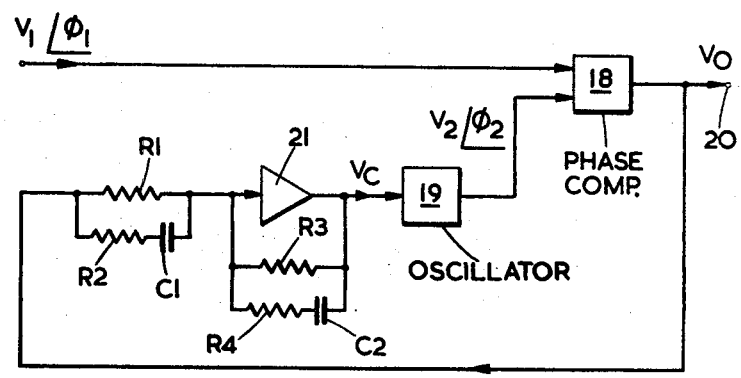
FIG. 2 illustrates one form of apparatus in this system for deriving the signal proportional to a change-function of absolute phase angle of the a.c. system.

The measuring apparatus 17 employed to derive the auxiliary signal may conveniently be of the type described in Ainsworth U.S. Pat. No. 3,611,040 general embodiment of which is shown in FIG. 2. In particular, an alternating input voltage of amplitude $V_1$ and absolute phase angle $\phi$ (single phase is shown for simplicity) is applied from the a.c. busbar to one input of a phase comparator 18. The other input of this comparator is applied from a voltage controlled oscillator 19 which develops a sinusoidal voltage of constant amplitude $V_2$, at a frequency, and hence absolute phase angle $\phi_2$, dependent on its input control voltage $V_c$. In turn, this input voltage is developed via a feedback loop from the output ($V_o$) of the comparator at a terminal 20, this loop including a high gain phase-reversing operational amplifier 21 having input components $R_1, R_2, C_1$ and feedback components $R_3, R_4, C_2$. The comparator is of a type delivering an output voltage $V_o$ proportional to $\cos(\phi_1 - \phi_2)$, so that for $\phi_1 - \phi_2 = \pi/2$, $V_o$ is zero.

In operation, during steady state conditions at the nominal frequency ($f_o$) of the a.c. system, the oscillator has an output equal to this frequency but operates at a phase angle which differs from that of the a.c. system by $\pi/2$. Thus, under these conditions, the output ($V_a$) of the comparator is zero. For sudden changes of phase in the input voltage from the a.c. system, however, the frequency and hence absolute phase of the oscillator remains temporarily unchanged and as a result a finite voltage appears at the output of the comparator, this output then controlling the oscillator via the feedback loop causing the phase of its output to tend back towards an angle of $\pi/2$ relative to that of the a.c. system with a time lag dependent on the component values of the amplifier 21.

In particular, for finite values of the control voltage $V_c$ the oscillator develops an output frequency $f + \Delta f$, where $\Delta f = K^1.V_c$ ($K^1$ = gain constant). Since for any frequency close to the nominal value $p\phi_2 = 2\pi\Delta f$ it then follows that the absolute phase $\phi_2$ of the oscillator output is $$\phi_2 = 2\pi K^1 V_c/p$$

where $p$ is the differential operator $d/dt$.

With these inputs, the output $V_o$ of the comparator has a nominal d.c. component proportional to $K^{11}V_1V_2 \cos(\phi_1-\phi_2)$, which is the component wanted, together with an unwanted a.c. component at a frequency $2f_o$ which may be readily removed by filters.

The provision of filters however increases the response time of the apparatus, and this may be readily avoided in a three phase scheme by applying the three phase input separately to three comparators. The other inputs to these comparators being applied from a three phase output from the oscillator. By summating the three output voltages from the comparators through three equal value resistors then, for balanced conditions, the a.c. outputs of the comparators cancel out one another, so that the resulting output $V_o$ is given by the d.c. component alone. Further details of this scheme are given in Ainsworth U.S. Pat. No. 3,611,040, referred to above.

As a simple alternative, the measuring apparatus 17 may operate on a "pulse-averaging" method. Here, a pulse of voltage of standardised width and amplitude is generated at each zero crossing of the alternating voltage. These pulses are then smoothed to produce a substantially ripple free direct voltage having an average value proportional to frequency, any frequency error then being obtained by subtracting it from a fixed d.c. reference voltage representing a predetermined frequency.

The time constant of the smoothing circuit is designed to determine one of the desired lag terms of the form $1/(1+pT_1)$ and the remainder of the required time function is readily formed by operational amplifiers etc.

A reduction in ripple, or a decrease in the smoothing time constant, may be obtained by using a higher frequency of operation or deriving pulses from zero crossings on more than one phase of the a.c. voltage.

As a further alternative, giving a slightly improved performance on the pulse-averaging method just described, a direct voltage may be generated proportional to the time interval between two successive zero crossings of the a.c. voltage, the value of the direct voltage being "updated" immediately following each zero crossing. By subtracting a fixed direct voltage from the output thus produced, a voltage is obtained proportional to any change in the period of the a.c. signal from a nominal value, that is, proportional to $d\phi/dt$.

With this latter method the direct voltage developed is ripple-free in the steady state, and its response time, which is very short, can be still further decreased by arranging for the measurement to be effective on the time period between successive zero crossings of adjacent phases in a multi-phase scheme rather than on one phase only.

Although the invention has been described in relation to particular embodiments illustrated, it is to be understood that various modifications may readily be made without departing from the scope of the invention. For example, the auxiliary feedback signal has been shown to be derived from a point on the busbar to which the d.c. link is connected but it may alternatively be derived from a more remote busbar, or even from the generators themselves. Further, if zero steady-state frequency error from a fixed reference is required, this may be provided by a control signal additional to those described, the signal being proportional to the integral of frequency error, that is, $f/p$. This function will be used additionally to those discussed above, but since it generally has an effect on a slow time scale it will not substantially affect the damping action.

In addition, the invention may readily be employed in schemes where the d.c. link has three or more terminals, with convertors either series-or parallel-connected, or where more than one independent d.c. link is used. In such schemes the general principle of control is that one of the signal components controlling the power of any given convertor should preferably be derived from the a.c. busbar to which that convertor is connected, since in this manner the overall damping effect in a complex a.c. system can be improved as the number of separate connection points for the convertors increases.

I claim:

1. A control system for controlling electrical power or current in a high voltage d.c. link connected between two a.c. systems, including apparatus for deriving an output signal proportional to a change-function of absolute phase angle $\phi$ of an alternating voltage in at least one of the a.c. systems, which change-function is substantially of the form $f(p) = K\phi.pT_1/(1+pT_1).pT_2/(1+pT_2) - pT_n/(1+pT_n)$ where $K$ is a gain constant, $T_1 - T_n$ are time constants and $p$ is the differential operator $d/dt$; said apparatus including means to generate said output signal by comparison of the phase angle of said alternating voltage with the phase angle of a signal from an oscillator, which latter phase angle is controlled by a signal which is a predetermined time function of said output signal; control signal generating means operative in response to a predetermined power or current order signal and to said output signal to generate a control signal; and a control circuit for controlling converting apparatus in the d.c. link to impart to said power or current, in response to said control signal, a component of variation proportional to said change-function.

2. A system as claimed in claim 1, in which said control signal is generated by summation of said output signal and said order signal.

3. A system as claimed in claim 1, in which a said output signal is derived in respect of the alternating voltage in each of said a.c. systems.

4. A system as claimed in claim 1, in which said order signal is manually controlled.

5. A system as claimed in claim 1, in which said alternating voltage is monitored at a point of connection of said converting apparatus to one of the a.c. systems.

* * * * *